United States Patent [19]

Schneidmiller

[11] Patent Number: 4,551,941
[45] Date of Patent: Nov. 12, 1985

[54] INSECT TRAP SELECTIVE FOR WASPS

[76] Inventor: Rodney G. Schneidmiller, 8604 S. Riverway, Spokane, Wash. 99212

[21] Appl. No.: 580,934

[22] Filed: Feb. 16, 1984

[51] Int. Cl.[4] .............................................. A01M 1/02
[52] U.S. Cl. ....................................... 43/107; 43/122; 43/121
[58] Field of Search ................. 43/122, 121, 107, 118, 43/119, 109, 121

[56] References Cited

U.S. PATENT DOCUMENTS

| | | | |
|---|---|---|---|
| 920,696 | 5/1909 | Turner | 43/107 |
| 1,184,486 | 5/1916 | Myers | 43/107 |
| 1,185,935 | 6/1916 | Pugh | 43/122 |
| 1,247,724 | 11/1917 | Sassenhoff | 43/107 |
| 1,496,135 | 6/1924 | Schwiening | 43/118 |
| 1,715,958 | 6/1929 | Strand | 43/122 |
| 1,772,729 | 8/1930 | Pisani | 43/122 |
| 4,244,135 | 1/1981 | Harwoods | 43/122 |

FOREIGN PATENT DOCUMENTS 19292 11/1930 Australia ............................... 43/107

Primary Examiner—Nicholas P. Godici
Assistant Examiner—Kurt Rowan

[57] ABSTRACT

A transparent cylindrical insect trap provides a bottom entry to a circular truncated entry cone that exits into a cylindrical entrapment chamber, all configured to inhibit insect exit therefrom. The trap top provides a screened orifice to allow volatile olfactory attractant to move upwardly out of the entrapment chamber and entry orifices allow it to move downwardly therefrom. Parts of the trap are colored to provide an optical attractant. The death of insects is hastened in the trap by excessive heat from the 'greenhouse' effect and overexertion caused by the trap design. Both attractants and trap structure cause selective entrapment of wasps.

2 Claims, 4 Drawing Figures

INSECT TRAP SELECTIVE FOR WASPS

BACKGROUND OF INVENTION

1. Related Applications

There are no applications related hereto heretofore filed in this or any foreign country.

2. Field of Invention

My invention relates generally to insect traps and more particularly to such traps that selectively entrap wasps.

3. Description of the Prior Art

The term 'wasp' is a generic name applied to insects of the order Hyminopteran that includes particularly hornets and yellow-jackets. The members of the Order are distinguished from bees in that they are carnivorous or parasitic. In all member species the female and worker populations have stingers that can produce a formidable wound and painful physiological reaction in animals. Since the dawning of recorded history and undoubtedly long before, man has had an ongoing battle with many of the more common species of this order of insects and by reason thereof many and various devices and processes have evolved for their control and destruction. The instant invention adds a new and novel member to this class of device to selectively entrap many species of wasps, aid their demise thereafter and contain bodies for subsequent disposal.

In so doing my trap differs from known insect traps in that its structure and function are particularly adapted and necessarily related to the psychology and physiology of wasps with the aid of modern materials. Wasps, in general, have primal anti-gravitational and positive light responses. That is, they tend to fly in an upward direction and to fly toward a light source. Both of these reactions become more pronounced when a wasp encounters stressful situations such as in attempting to escape entrapment or in anxiety situations such as when seeking an attractant. Wasps also appear to have color preferences and some colors seem to be optical attractants for them. They appear to be particularly attracted to a bright yellow color and this color seems somewhat selective to wasps. Certain odoriferous substances also appear to be olfactory attractants for wasps and some such substances appear to be quite specific as attractants only to the wasp families. It has long been known that normal butyl benzoate is such a selective attractant and pentyl pentanoate and dimethyl benzyl carbinyl acetate have both been suggested as such atractants, though they do not appear to be so well known nor specific as such.

My invention is adapted particularly to make use of the recited psychology, or physiology as the case may be, of wasps in selectively catching and killing them. I provide a vertically elongate trap with the top defining a screened opening and the bottom a plurality of entrance orifices to cooperatively allow airflow in a vertical direction through the trap to cause the dissemination of a volatile olfactory attractant contained therein. Most traps for flying insects heretofore known have been of a bottle-type construction with only a single entry orifice or plural orifices defined so as to prevent the free flow of air through the trap apparently with the thought of more fully containing the attractants used therewith to provide a longer life for them.

The top and bottom portions of my trap are formed of an opaque yellow colored material to act as an optical attractant for wasps in the environs of the trap. The body portion of the trap is formed of a transparent plastic. This body also acts somewhat as an attractant for wasps because they see other members of their species inside the trap, and though the bulk of wasp species are solitary rather than social, a wasp outside the trap still wants to enter because apparently it believes that there is food or some similar attractant where others of the species congregate. The transparent trap body serves a further purpose attracting wasps into the trap as it provides light above the entrance orifices defined in the opaque bottom which tends to cause an entering wasp to move upwardly toward the light source by reason of its innate psychology. The transparent body also allows entry of heat rays and tends to provide a 'greenhouse' effect to increase temperature within the entrapment chamber to thereby speed the demise of insects therein.

The bottom element of my trap provides plural entrance orifices defined in an undercut portion immediately above the trap bottom. A perch is provided at the orifice to allow a wasp to rest there and make entry through the orifice easier by crawling if desired. The bottom element of the trap is opaque so the entrance orifices will be relatively darker and there will be more light thereabove which tends to cause the wasp to enter through an entryway. The entryways cooperate with the orifice in the top element and internal trap structure to allow relatively free passge of air through the trap so that a volatile attractant passes out of the entryways and is most strongly concentrated therein. This again causes a wasp to approach the trap and to enter to attempt to gain access to the source of the attractant.

A truncated cone is provided inwardly of the entrance orifices and between them and the internal chamber of the trap. The lower portion of this cone is solid and opaque to enhance the darkness about the entry orifices and to concentrate light at the upper screen portion to attract wasps to that area. The cone has relatively steep smooth sides to discourage or prevent wasps from alighting thereon to thusly require continued exertion in flying which hastens their demise once in the entrapment chamber.

My invention is distinguished from prior flying insect traps individually or in combination by reason of the aforesaid structural features which necessarily perform the functions indicated and my invention is novel over the known art by reason thereof.

SUMMARY OF INVENTION

My invention provides generally a transparent peripherally defined cylindrical body having removable opaque top and bottom elements, colored to serve as optical attractants, to define an insect entrapment chamber.

The top element provides a screened orifice to allow passage of the ambient atmosphere therethrough. The bottom element defines plural orifices for insect entry in its lower portion which cooperate with the top to allow passage of the ambient atmosphere to thusly allow a circulation pattern through the trap to disseminate a volatile attractant carried therein. The entry orifices each have an adjacent perch to aid insect entry and septa separating them from each other to discourage insect exit, at least through other than the entry orifice. The bottom element provides a cup-like container for an olfactory attractant and its carrier. A screen entry element in the shape of a truncated cone is interposed between the bottom insect entry orifices and the trap chamber to aid insect entry and discourage exit.

In providing such an insect trap it is:

A principal object of my invention to create a trap for flying insects that is quite selective to various members of the order Hyminopteran including particularly hornets and yellow-jackets.

A further object of my invention to provide such a trap that contains a volatile olfactory attractant, carried in the internal chamber thereof, to be dispersed by relatively free airflow vertically therethrough.

A further object of my invention to provide such a trap that is particularly configured to accommodate the psychology of the insects which it is intended to entrap, to encourage their entrapment, and to cause their rapid demise thereafter.

A still further object of my invention to provide such an insect trap that does not contain fluid wherein insect remains are collected and may putrify, but rather dessicates insect remains to tend not to provide an attractant for flies.

A still further object of my invention to provide such an insect trap that is of new and novel design, of simple and economic manufacture, and one otherwise well suited for the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one practical and preferred embodiment being illustrated in the accompanying drawings as is required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

Figure 1:
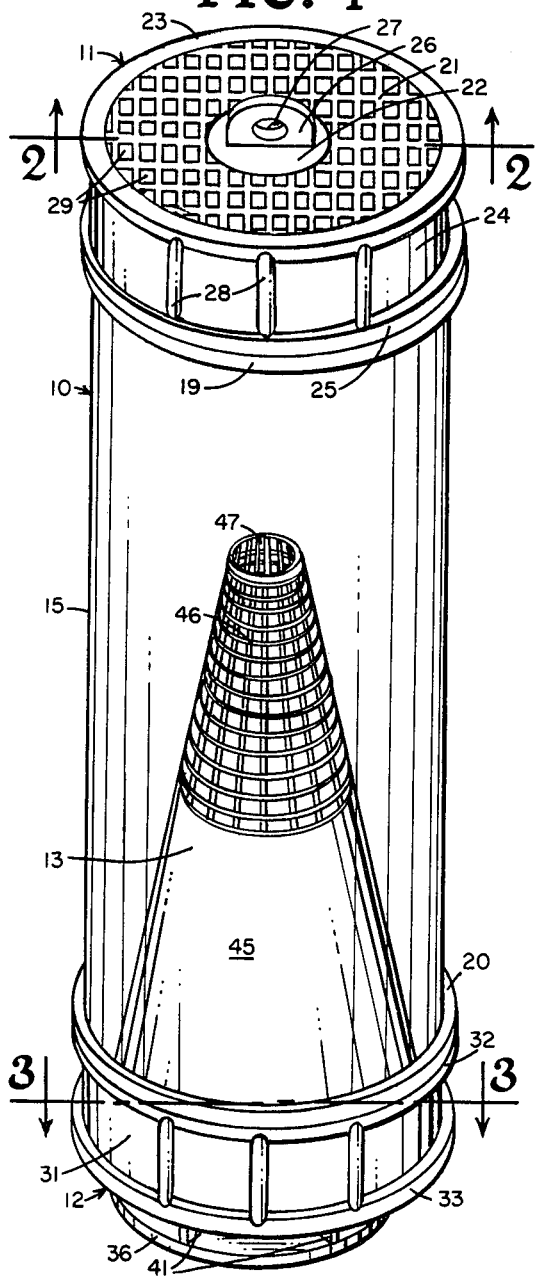
FIG. 1 is an isometric surface view of my invention showing its various elements, their configuration and relationship.

My invention generally provides elongate peripherally defined cylindrical body 10 releasably carrying mechanically interconnected top element 11 and bottom element 12 to define an entrapment chamber with conical entry element 13 in the lower portion thereof to define an entryway and limit egress.

Cylindrical body 10 is a pipe-like structure defined by elongate annular body element 14 providing external surface 15 and internal surface 16 defining the vertical portion of an entrapment chamber. Inner surface 16 defines a simple circular cylindrical shape to provide easy cleaning and no resting place for insects within the entrapment chamber. The uppermost portion of body element 14 defines upper external threads 17 and the lowermost portion of the element defines external bottom threads 18. Preferably laterally extending upper annular boss 19 and lower boss 20 are provided at the inner extension of each set of threads 17,18 to abut with similar structures defined at the inner portions of the top and bottom elements and provide additional strength and rigidity in this area to aid in preventing cracking or breaking of the end portions of the body element.

The exact dimensioning and configuration of body element 14 is not particularly critical to my invention but for ordinary purposes a cylinder having a diameter of approximately four inches and a length of approximately twelve inches is quite effective. Other peripheral configurations than a circular cylinder may also obviously be used, but not so easily, as with them it is generally more difficult to releasably fasten top and bottom elements. The body element is formed of a reasonably rigid, durable transparent material that will admit both light and heat waves. I have found polystyrene and polyproplyene polymers to be ideal for this purpose though other materials would serve the purpose of my invention, if not so well.

Top element 11 provides circular screen top 21 carrying in its medial portion hanger plate 22 and supporting at its periphery rim 23. Peripheral rim 23 supports depending cylindrical fastening skirt 24 which in turn supports lowermost annular cap boss 25 in its lowermost extension. Hanger plate 22 supports hanger 26 structurally communicating therewith and this hanger in turn defines hanging hole 27 to aid interconnection with some suspensive support device. Orifices 29 defined in screen top 21 are such as to allow the relatively free passage of air therethrough but yet are small enough to prevent the passage of wasps. The lower inner surface of depending skirt 24 provides internal thread 30 configured to threadedly engage upper thread 17 of the cylindrical body to allow removable mechanical attachment of the top element to the cylindrical body. Preferably peripheral rim 23 and lower boss 25 have similar lateral extension, somewhat greater than that of depending skirt 24 and substantially the same as upper boss 19 of the cylindrical body. The purpose of rim 23 and boss 25 again is to strengthen the upper and lower portions of the top element and in the case of the lower boss to aid in forming a joinder with the trap body. Preferably plural spaced protuberances 28 are provided extending substantially vertically between the top rim 23 and lower boss 25 to aid manual grasping when necessary for removal of a top from a body.

The configuration and dimensioning of the top structure is not particularly critical to my invention except as immediately hereinbefore stated. The top is constructed from an opaque or translucent material that at least somewhat restricts the passage of light and is of a fairly bright yellow color that is attractive to wasps. Preferably the top structure is formed in a unitary fashion by injection molding of a polymeric material similar to the body structure.

Figure 4:
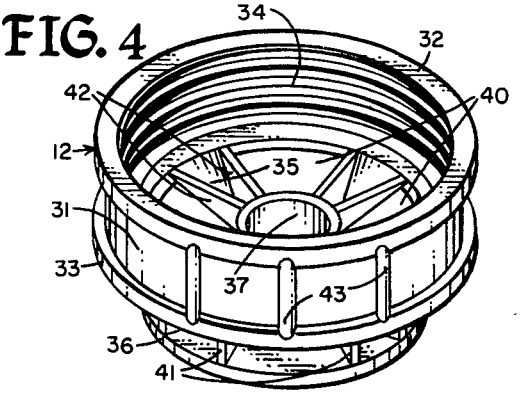
FIG. 4 is an isometric surface view of the bottom element of my invention showing particularly the entry orifice structure and attractant container.

Bottom 12 is shown especially in the isometric view of FIG. 4 where it is seen to comprise a cap-like element with vertical cylindrical side 31 terminating with upper rim 32 in its uppermost portion and lower rim 33 in its medial portion. The inner surface of vertical side 31 defines threads 34 configured to threadedly engage lower threads 18 of the body.

The lower part of bottom element 12 below lower rim 33 defines annular undercut portion 35 sloping axially inwardly to the lower part of attractant well 37 at the point of its support on bottom disc 36. Attractant well 37 is a cylindrical cup-like structure, with a diameter approximately one-third that of bottom element 12, that extends upwardly some distance from bottom plate 36 to define a container wherein a volatile attractant and its carrier 38 may be placed and maintained. Preferably the diameter of bottom disc 36 is approximately the same as the internal diameter of the cylindrical side of the bottom element so that it extends radially outwardly sufficiently to provide perches for alighting wasps. Cylindrical void 39 may be defined beneath attractant well 37 to save material, if desired, as that well need not normally have any great depth to accept appropriate quantities of attractant and its carrying material.

Plural entryways 40 are defined in spaced relationship in annular undercut portion 35. The size and configuration of these orifices is not critical so long as they allow wasps easy entry but yet leave some space between entryways to aid in preventing wasps from exiting by an oridice adjacent to that providing entry. This action is further aided by plural internal septa 42 extending in cooperating pairs on each side of each entryway from the interior surface of undercut portion 35 to the exterior portion of attachment well 37. These septa also tend to block visibility of a wasp of adjacent entryways to tend to prevent its exit by reason of attraction to light entering therefrom.

Similar external septa 41 are provided adjacent the exterior of each entryway, extending from the exterior surface of undercut portion 35 to the upper surface of bottom plate 36. These septa tend to direct wasps to a particular entryway and to prevent excessive light from entering an entryway to distract the course of travel of an entering wasp.

Preferably grasping elements 43 extend in a spaced, vertical orientation between upper and lower rims 32, 33 of the bottom to aid the manual manipulation of the element, especially as when moving it relative of the body. Preferably the radial extension of these elements is substantially the same as that of the two rims 32, 33. Obviously these elements are not essential but convenient.

The inner medial portion of the bottom element defines horizontal fastening ledge 44 extending radially inwardly a distance sufficient to support the base of a conical entry element. The inner diameter of this ledge is preferably about the same as the inner diameter of the chamber defined by the cylindrical body so that the lowermost portion of the body may be positioned to hold an entry element in position thereon.

The bottom element again is formed of some reasonably rigid and opaque colored material similar to the top element. The material should be of a color to optically attract wasps, preferably a bright medium cadmium yellow hue.

Figure 2:
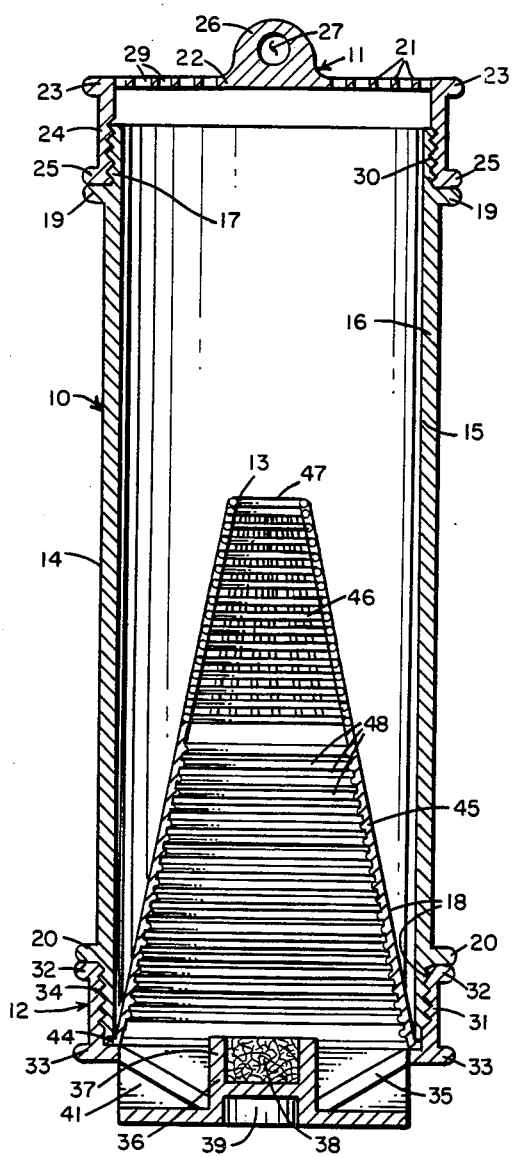
FIG. 2 is a medial vertical cross-sectional view of the insect trap of FIG. 1, taken on the line 2—2 thereon in the direction indicated by the arrows.
Figure 3:
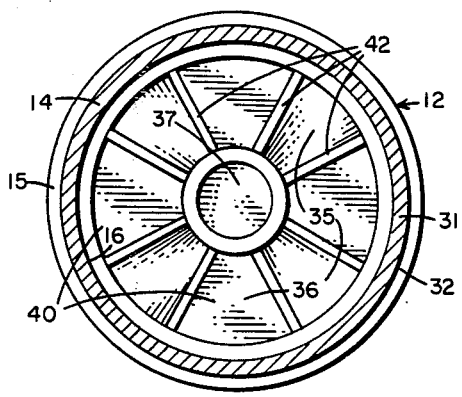
FIG. 3 is a horizontal cross-sectional view of the insect trap of FIG. 1, taken on the line 3—3 thereon in the direction indicated by the arrows.

Conical entry element 13 is a truncated cone having horizontal outwardly extending fastening rim 48 with lower solid base portion 45 and upper screen portion 46. The entry cone's truncation defines uppermost orifice 47 opening into the entrapment chamber defined by the trap body. This orifice is of a size to allow convenient passage of a wasp, but not much larger. The diameter of entry cone fastening rim 48 is very slightly less than the diameter of the bottom element fastening ledge 44 so that the entry cone may be placed thereon and releasably maintained by screwing the lowermost portion of the body thereagainst as illustrated particularly in FIG. 2.

The inner surface of solid base portion 45 is provided with some means to aid a wasp in crawling upwardly thereover, in the case illustrated, plural spaced annular protuberances 49. The outer surface of the base is smooth to present no place where a wasp may conveniently alight or crawl. Upper screen portion 46 defines a plurality of spaced orifices that are small enough to prevent the passage of a wasp therethrough, but large enough to allow passage of substantial light and to aid a wasp's crawling thereover.

The entry element extends upwardly in the chamber defined by the trap body to about its medial portion to provide a structure with a smooth surface inclined at a substantial angle, preferably about seventy-five degrees, upon which a wasp may not generally alight and rest. The entry element is formed of some reasonably rigid and opaque material so that the base prevents the passage of light through that portion of the element. Again plastics are preferred because of their ease of formation and other desirable features.

Having thusly described the structure of my invention, its function may be understood.

Firstly an insect trap is formed and assembled as specified. Attractant well 37 is provided with an appropriate volatile olfactory attractant specific for wasps. Several such attractants are known among which are butyl benzoate, pentyl pentanoate and dimethyl benzyl carbinyl acetate. I prefer butyl benzoate because of its greater specificity but the particular attractant is no part of my invention per se and all attractants set forth have heretofore become publicly known and are usable.

After my trap is assembled it is operatively positioned, normally by suspending it by hanger 26 from some support. To be most effective the trap should be positioned in an area having free access for wasps and substantial light, preferably direct sunlight for at least a portion of the day.

Once positioned the olfactory attractant will gradually vaporize and admix with air in the entrapment chamber. This mixture of attractant and air will pass from the trap, normally both upwardly through the top element and downwardly through the entry orifices of the bottom element depending upon particular physical conditions in and about the trap. However the attractant passes from the trap, it will permeate the atmosphere about the trap, generally graduating in concentration from a maximum at the trap. This olfactory attractant and the optically attracting color of parts of the trap will both tend to attract wasps within a sensible distance toward the vicinity of my trap. Since the attractant vapors are generally heavier than air and since the entryway orifices are smaller in area than the top screen, there will tend to be the stronger concentration of attractant immediately about entryways 40. This and the position of the entryways will cause wasps in the vicinity of my trap to eventually come to the entryways or at least near them.

This action is further enhanced by the wasps' anti-gravitational psychological response which causes the insect to tend to approach objects of interest in an upward course from a lower position. Most wasps will approach from a position beneath the trap and if they do not, since they can not gain entrance through the top of the trap, they will tend to fly about it and ultimately by reason of the probabilities involved tend to come to an approach posture that directs them toward the lower entryways.

Wasps sometimes enter directly and immediately through the entryways but more commonly they will rest on the perch structure created by bottom disc 36 laterally adjacent to the entrance ways. Whether a wasp alights or not, it will tend to enter through an entryway since that is the area of greatest concentration of the olfactory attractant. Quite commonly the entry posture will be by crawling though on occasion wasps fly directly through the entryway. Once entry is begun the area immediately inwardly of the entrance orifice tends to be darker because of the structure of the trap and especially the opaque lower portion of entry element 13. The lightest area visible to the wasp will be in the medial portion of the entry element. Since the wasp is attracted by light it will tend to move toward the lighter area, again generally by crawling but possibly by flying. The inner surface of the lower solid portion of the entry element provides structure to aid the wasp in crawling therealong. As the wasp approaches the upper portion of the solid part of entry element 13, light will become greater and the entry element orifice apparent so the wasp ultimately will move upwardly either by crawling or flying across the inner surface of the upper mesh part of the entry element to exit into the surrounding entrapment chamber.

This course of travel is motivated largely by the antigravity and light seeking reactions of wasps. As a wasp moves to the inner surface of the screen portion of entry element 13 it will tend to feel somewhat entrapped and its psychological responses are enhanced both as to quantity and primitive nature by the stressful situation then generally existent. The wasp will not move downwardly because of the darker area below and the natural upwardly directed escape response. By the probabilities involved a wasp will almost certainly exit through the orifice in the upper portion of the entry member and into the entrapment chamber. The general effect of external septa 41 about entryways is to tend to direct a wasp into a particular entryway and the general affect of internal septa 42 is to block light from an adjacent entryway so that the lightest area appearing to a wasp will be upwardly through the entry element rather than outwardly through an adjacent entryway. None of these responses are absolute and tend to be probabilistic, but experience has proven the probabilities to be substantially in favor of entrapment.

Once a wasp has entered the entrapment chamber defined by the cylindrical body it will have no food or water and will ultimately expire. The metabolism of wasps is reasonably high and under normal circumstances without other influencing factors a wasp will die within the trap at least within a twenty-four hour period. A wasps' death is hastened, however, by reason of various physical factors inherent in the trap. Firstly, the entrapment chamber has no particular place for a wasp to alight and rest so, in general, it will tend to fly; and because of this it will use more energy and increase its metabolism so that it will sooner die. Secondly, once the wasp enters the entrapment chamber it soon comprehends its entrapment and the panic situation resulting from this realization tends to further enhance both physical response and metabolism. Thirdly, the cylindrical body of my trap is formed from transparent material which allows entry of heat radiation and this tends to be entrapped within the entrapment chamber to create the so called 'greenhouse' effect which tends to raise the temperature of the atmosphere within the entrapment chamber. This increased temperature will often be sufficient to kill wasps by itself, especially if the trap be positioned in an open light situation, but even if not it still will be present to tend to hasten their demise by dehydration.

It obviously is physically possible that a wasp, once it has entered the entrapment chamber, may exit through one of the entrance routes. The probabilities of this happening however, are so small because of the wasp reactions hereinbefore described that they tend to be insignificant.

It is to be noted that my trap has no liquid element as do many insect traps heretofore known and further that air tends to flow freely therethrough, and because of this insects carcasses within the trap will tend to dessicate whereas in many other known traps they tend to petrify. In these prior traps with putrefying insect bodies, the odors caused thereby will tend to attract flies and this, of course, is not desirable in a trap specific for wasps. There is very little such attraction of flies by my trap because of the desiccative action. Again, flies by preference have a positive gravity response and prefer to enter an orifice from the top rather than the bottom so this response also tends to keep flies out of my wasp trap.

It is further to be noted that the entry element of my trap beside its primary entrapment function also tends to keep insect bodies away from the entry portions of my trap and from plugging the attractant well. This gives the trap a longer life span between emptyings and tends to make it more efficient than it would be if insect carcasses were present in the entryways.

It is further to be noted that though individual attractants have been specified in describing my invention they constitute no part of it per se and their specification is merely informative. Structural features of my trap are quite operative with most olfactory attractants that are reasonably specific to various of the members of the wasp family.

The foregoing description of my invention is necessarily of a detailed nature so that a specific embodiment of it may be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. An insect trap selective to wasps comprising, in combination:
   a peripheral cylindrical body defining an entrapment chamber and being formed of transparent material that transmits radiant heat and light;
   a top element defining a plurality of orifices of size to prevent the passage of wasps therethrough;
   a bottom element formed of semi-opaque material having a yellow color attractive to wasps and having;
   an undercut lower portion defining a plurality of entryways therein for access therethrough,
   a disc-like bottom plate with a diameter greater than that of the undercut portion, immediately therebelow to form a horizontal perch adjacent each entryway and
   an attractant well on the upper surface of the bottom plate containing a volatile substance that is a specific olfactory attractant to wasps;
   a peripherally defined entry element, interposed between the bottom element and the entrapment chamber defined by the cylindrical body, comprising an upright truncated conic structure defining an orifice into the entrapment chamber at its upper truncated portion, a solid lower portion defining internal ridges to aid wasp crawling thereover and a screen-like upper portion defining plural spaced orifices small enough to prevent the passage of wasps therethrough and allow their crawling thereover.

2. An insect trap selective to wasps comprising, in combination:

an elongate cylindrical body, formed of material that transmits heat and light radiation, peripherally defining an entrapment chamber and having means for releasable attachment of top and bottom elements at each of its ends;

a top element, having means for releasable attachment to the cylindrical body, with a screen-like orifice defining plural spaced holes sized to permit the passage of air but prevent the passage of wasps therethrough and means for attachment to a supporting structure;

a bottom element, formed of opaque material and having a color attractive to wasps, means for releasable attachment to the bottom of the cylindrical body, an attractant well carrying an olfactory attractant for wasps, a lower annular undercut portion defining a plurality of entryways horizontal therethrough with plural external septa laterally adjacent the external surface of each entryway and plural internal septa laterally adjacent the internal surface of each entryway, said internal septa being formed of opaque material, and a disc thereunder providing a horizontal perch-like support adjacent each entryway; and a truncated conic entry element, communicating between the bottom element and the entrapment chamber defined by the body, having a lower opaque solid part with internal ridges and an upper screen-like part defining spaced holes configured to prevent passage of wasps therethrough, said entry element being releasably maintained in an upright position between the bottom element and body and providing at its top a truncated portion for wasp entry into the entrapment chamber.

* * * * *